No. 787,149. PATENTED APR. 11, 1905.
J. H. CLARK.
MEANS FOR CONTROLLING THE SPEED OF STEAM ENGINES.
APPLICATION FILED FEB. 23, 1905.

7 SHEETS—SHEET 1.

Witnesses
Geo. W. Young.
George Felter.

Inventor
James H. Clark
By H. G. Underwood
Attorneys

No. 787,149. PATENTED APR. 11, 1905.
J. H. CLARK.
MEANS FOR CONTROLLING THE SPEED OF STEAM ENGINES.
APPLICATION FILED FEB. 23, 1905.

7 SHEETS—SHEET 2.

Witnesses
Geo. W. Young.
George Felber.

Inventor
James H. Clark
By H. G. Underwood
C. Worwerz

No. 787,149. PATENTED APR. 11, 1905.
J. H. CLARK.
MEANS FOR CONTROLLING THE SPEED OF STEAM ENGINES.
APPLICATION FILED FEB. 23, 1905.

7 SHEETS—SHEET 4.

Witnesses
Geo. W. Young.
George Felber.

Inventor
James H. Clark
By H. G. Underwood
Attorneys

No. 787,149. PATENTED APR. 11, 1905.
J. H. CLARK.
MEANS FOR CONTROLLING THE SPEED OF STEAM ENGINES.
APPLICATION FILED FEB. 23, 1905.

7 SHEETS—SHEET 6.

No. 787,149. PATENTED APR. 11, 1905.
J. H. CLARK.
MEANS FOR CONTROLLING THE SPEED OF STEAM ENGINES.
APPLICATION FILED FEB. 23, 1905.

7 SHEETS—SHEET 7.

Witnesses
Geo. W. Young,
George Felber.

Inventor
James H. Clark
By H. G. Underwood
Attorney

No. 787,149.  
Patented April 11, 1905.

UNITED STATES PATENT OFFICE.

JAMES H. CLARK, OF PORTAGE, WISCONSIN, ASSIGNOR OF ONE-EIGHTH TO HENRY M. FORBES, ONE-EIGHTH TO RICHARD H. DALTON, AND THREE-FOURTHS TO THE J. H. CLARK COMPANY, OF PORTAGE, WISCONSIN.

MEANS FOR CONTROLLING THE SPEED OF STEAM-ENGINES.

SPECIFICATION forming part of Letters Patent No. 787,149, dated April 11, 1905.

Application filed February 23, 1905. Serial No. 246,896.

*To all whom it may concern:*

Be it known that I, JAMES H. CLARK, a citizen of the United States, and a resident of Portage, in the county of Columbia and State of Wisconsin, have invented certain new and useful Improvements in Means for Controlling the Speed of Steam-Engines; and I do hereby declare that the following is a full, clear, and exact description thereof.

My invention has especial reference to means for controlling the speed of steam-engines; and it consists in certain peculiarities of construction and combination of parts, as will be fully set forth hereinafter in connection with the accompanying drawings and subsequently claimed.

Figure 1:
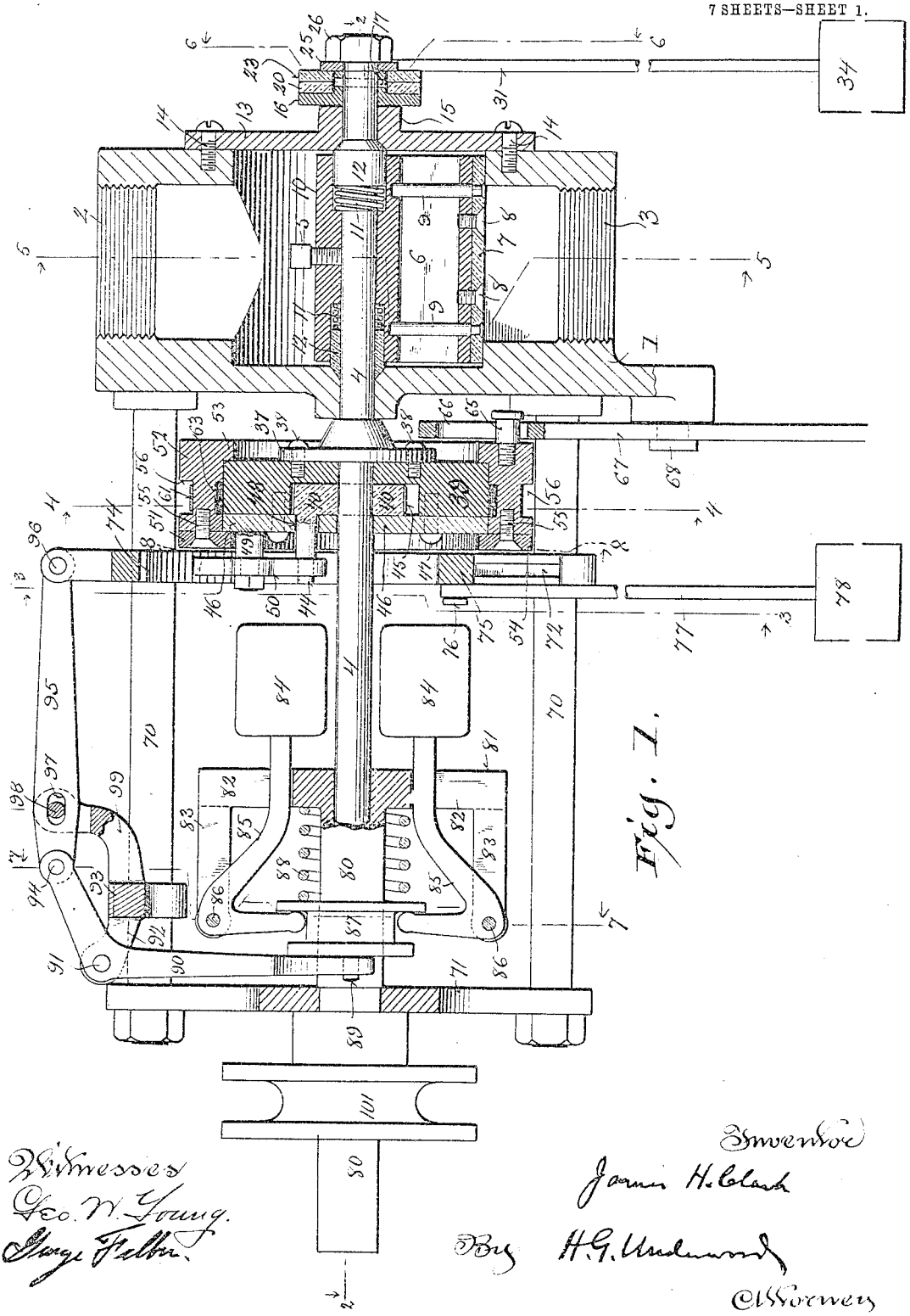
Figure 2:
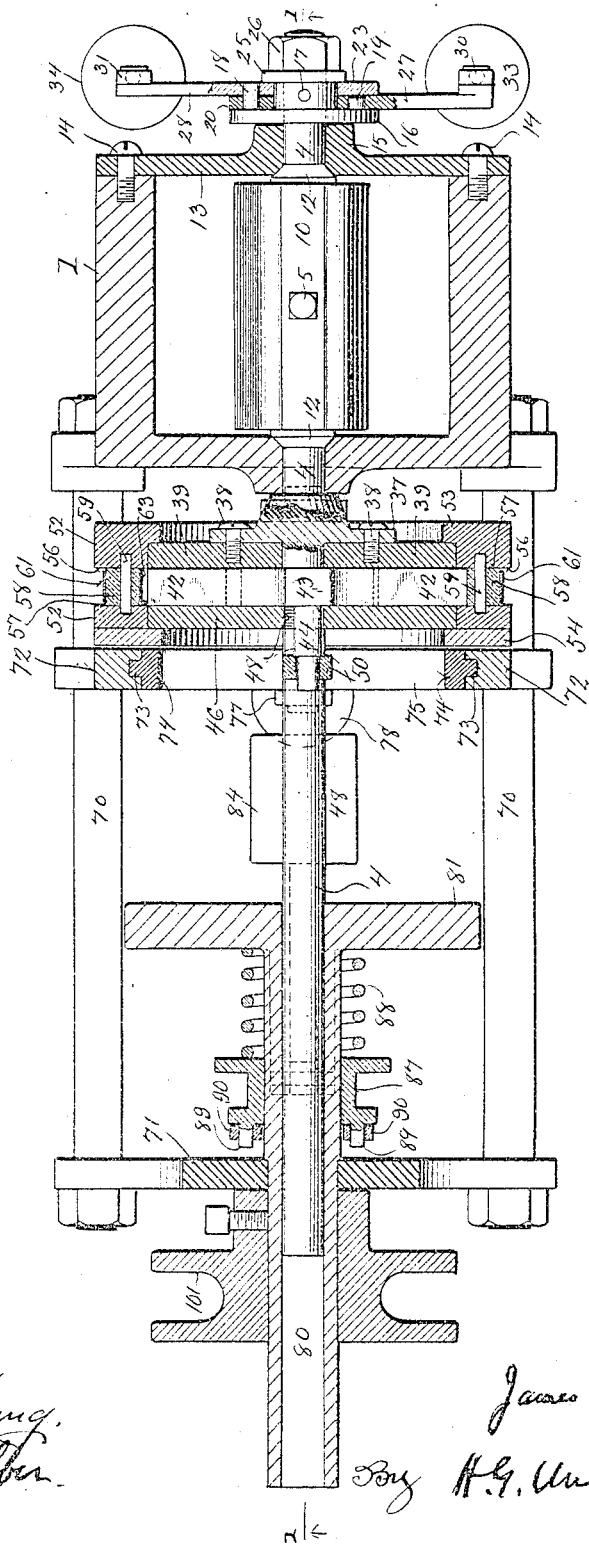

In the said drawings, Figure 1 is a vertical longitudinal central sectional view of my said device, taken on the line 1 1 of Fig. 2. Fig. 2 is a horizontal longitudinal view of the same, taken on the line 2 2 of Fig. 1. Figs. 3, 4, 5, 6, 7, and 8 are transverse vertical sectional views on the lines 3 3, 4 4, 5 5, 6 6, 7 7, and 8 8, respectively, of Fig. 1. Figs. 9, 10, and 11 are detail views of the dash-pot connections.

Referring by numerals to the said drawings, 1 designates the valve-casing of the engine, which in practice has a steam-inlet pipe connected with the threaded upper end 2 and a steam-outlet pipe similarly connected with the threaded lower end 3, which pipe feeds directly to the engine.

Figure 5:
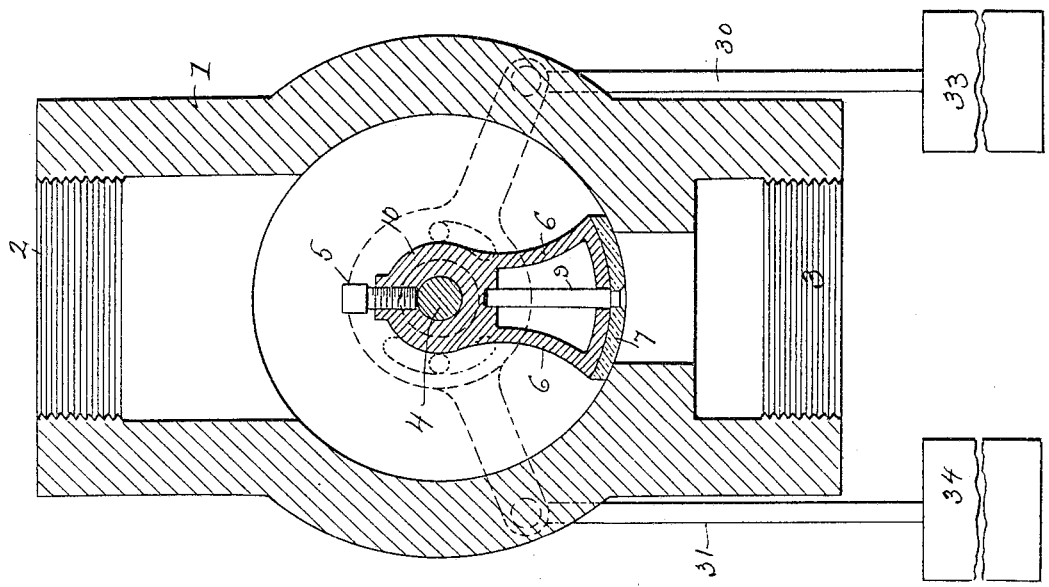
Figure 6:
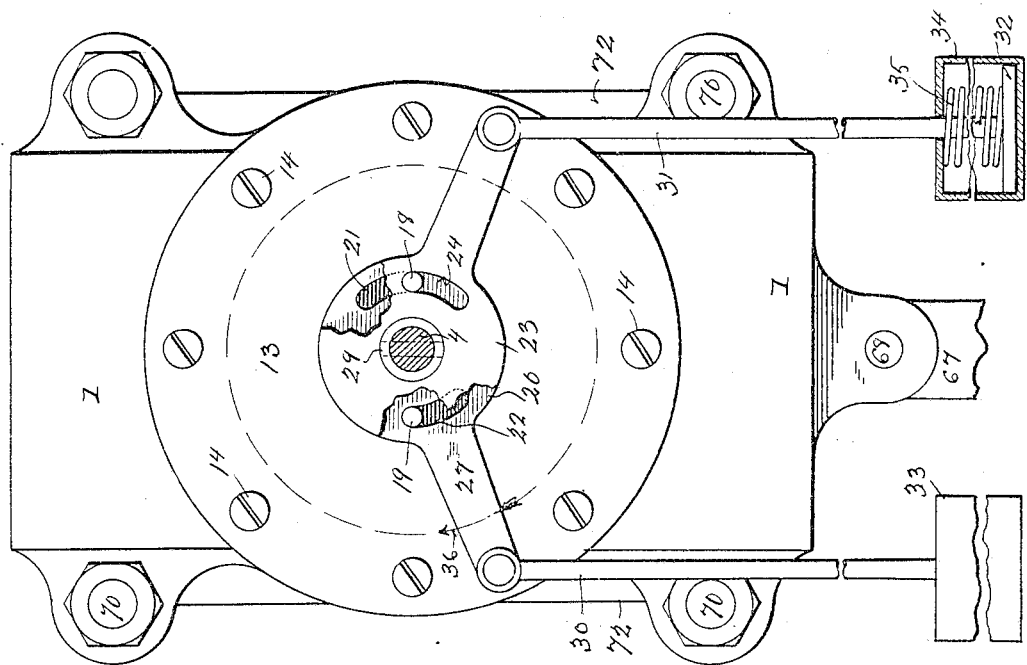
Figure 8:
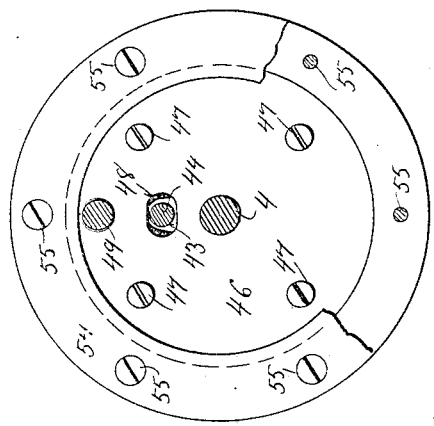
Figure 7:
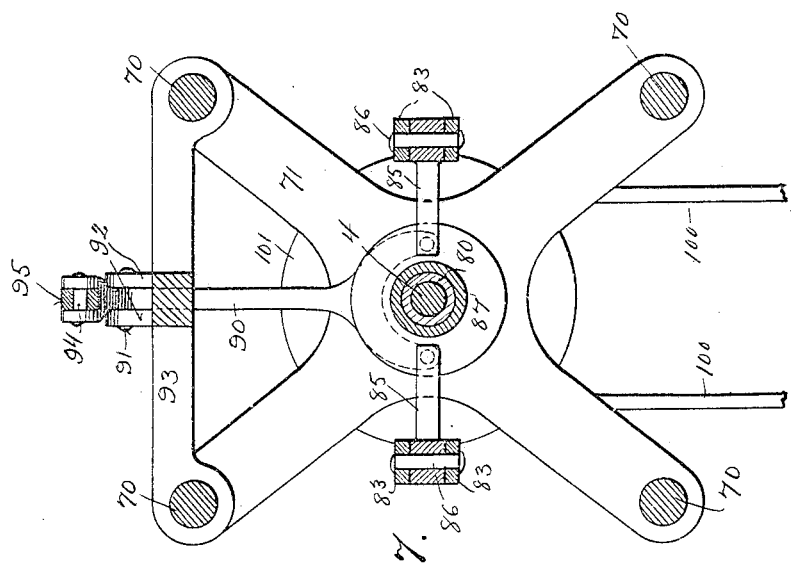

4 designates the valve-stem. Fast on said stem by set-screw 5 is a balanced rock-valve 6, as best shown in Fig. 5, formed with a separate plate 7, held to the valve with screws 8 8, there being also pins 9 9, which pass through said plate (to which their lower ends are riveted) and into recesses in the hub 10 of the valve, which receives the valve-stem 4. The bore of this hub is increased in diameter at each end to receive the springs 11 and glands 12, which latter have conical ends which take into the side walls of the said valve-casing 1 and cap-plate 13 and being forced tightly against the same by the said springs act like stuffing-boxes to prevent any leakage of the steam at these points. The valve-stem 4 projects through the casing 1 and cap-plate 13, the latter being held to the casing by screws 14 14, as shown in Figs. 1 and 2. Just beyond the boss 15 of the cap-plate on the end of the valve-stem 4 there is a disk 16 on the said valve-stem, which disk has an integral hub 29, through which extends a pin 17, whereby the hub is made fast to the valve-stem, and this disk carries two diametrically-opposed pins 18 and 19 of unequal length. Fitting over the hub 29 of the disk 16 are two other disks, one of them, 20, (shown in Fig. 11,) having two arc slots 21 22 to receive both pins 18 19, while the other disk, 23, Fig. 10, has only one slot 24 to receive the end of the longer pin 18 on the disk 16. The disks 20 and 23 are loose on the hub of disk 16 and held in place by washer 25 and nut 26 on the outer end of the valve-stem 4. Disk 20 has an arm 27 projecting therefrom and disk 23 a like arm 28, the said arms being valve-levers and connecting lever 27 with rod 30 and lever 28 with rod 31, whose lower ends have plates 32 fitting in dash-pots 33 34, as best shown in Fig. 6. Any form of dash-pot may be used; but in Fig. 6 I have shown springs 35 to depress said plates 32 and draw down on the said valve-levers. This construction is for bringing the valve to its normal or closed position, as shown in Fig. 5. When the valve is rotated in the direction of the arrow 36, (shown in Fig. 6,) the pin 19, being fast to the stem 4, will lift valve-lever 27, and pin 18 will move down to the lower end of slot 24 in disk 23 without moving said disk or its valve-lever 28, and as soon as the valve is released the plate in the dash-pot 33 will be forced down to its former position, drawing down on rod 30 and valve-lever 27 to close the said valve, as before. When the valve is moved in the opposite direction to that just described, the valve-lever 28 is raised by pin 18 without disturbing valve-lever 27, and, similarly, when the valve is released the dash-pot 34 will force the plate in said dash-pot down again and restore the valve-lever to its former normal closed position.

Figure 4:
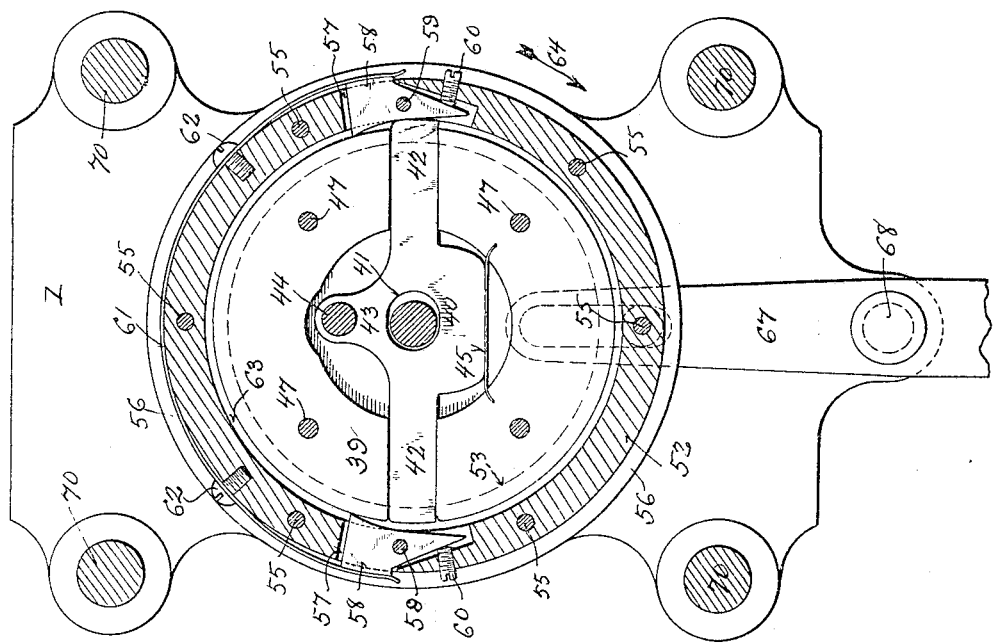

The means for opening the valve will now be described. Referring especially to Figs. 1, 2, and 4, fast on the valve-stem 4 is shown an annular flange 37 next to the inner side of valve-casing 1, and held fast to this flange by screws 38 38 is a chambered disk or housing 39, having a central recess and communicating opposed side recesses for the reception of a double catch-plate 40, the central part of which has an oblong slot 41, which receives the valve-stem 4, and arms 42 42, which have movement in said side recesses, and said catch-plate is also formed with a right-angled central extension 43, carrying a lateral stud 44, while opposite extension 43 the said catch-plate bears against a friction-spring 45, secured to said disk 39. The catch-plate 40 is held in place by a cap-plate 46, secured to disk 39 by screws 47 47. The cap-plate 46 has an elongated slot 48, through which stud 44 projects, and is also provided with a lateral stud 49 in line with slot 48 and valve-stem 4, said stud 49 being shouldered and its reduced end being screw-threaded. Pivoted on this reduced end of stud 49 is a tappet-finger 50, the lower end of this finger having a slot 51 for engagement with stud 44 and the upper end of this finger 50 having a V-shaped notch therein. This tappet-finger when rotated on its pivot will reciprocate the catch-plate 40, as hereinafter described.

Fitting around the described chambered disk 39 is an annular wrist-plate 52, with an inner annular flange 53, against which one face of said disk rests, and a retaining-ring 54 is held to said plate 52 by screws 55, the inner periphery of said ring 54 resting against the outer face of cap-plate 46 and holding it in position. The periphery of the wrist-plate 52 is formed with a circumferential groove 56, through which plate are cut diametrically opposite recesses 57 57, communicating with said groove for the reception of the pivoted dogs 58 58. These dogs are mounted on pivots 59 and have tapered tails, against which adjusting-screws 60 bear, the heads of these dogs extending out through said recesses 57, and engage with a spring 61, resting in the groove 56, and held in place by screws 52. The inner faces of the heads of dogs 58 are curved and terminate in points which project into an inner peripheral groove 63 of said wrist-plate 52 and come against the outer periphery of the chambered disk 39 in the path of the arms 42 of the catch-plate 40, so that when the wrist-plate 52 is rotated in the direction of the arrow 64 in Fig. 4 the point of the head of the adjacent dog 58 will ride over the projecting end 42 of the catch-plate, and on its return movement said point will catch under the said end 42 and move same and the disk 39 and connected parts and open the valve and keep it open until the catch-plate is withdrawn from engagement with said dog by the tappet-finger 50.

Figure 3:
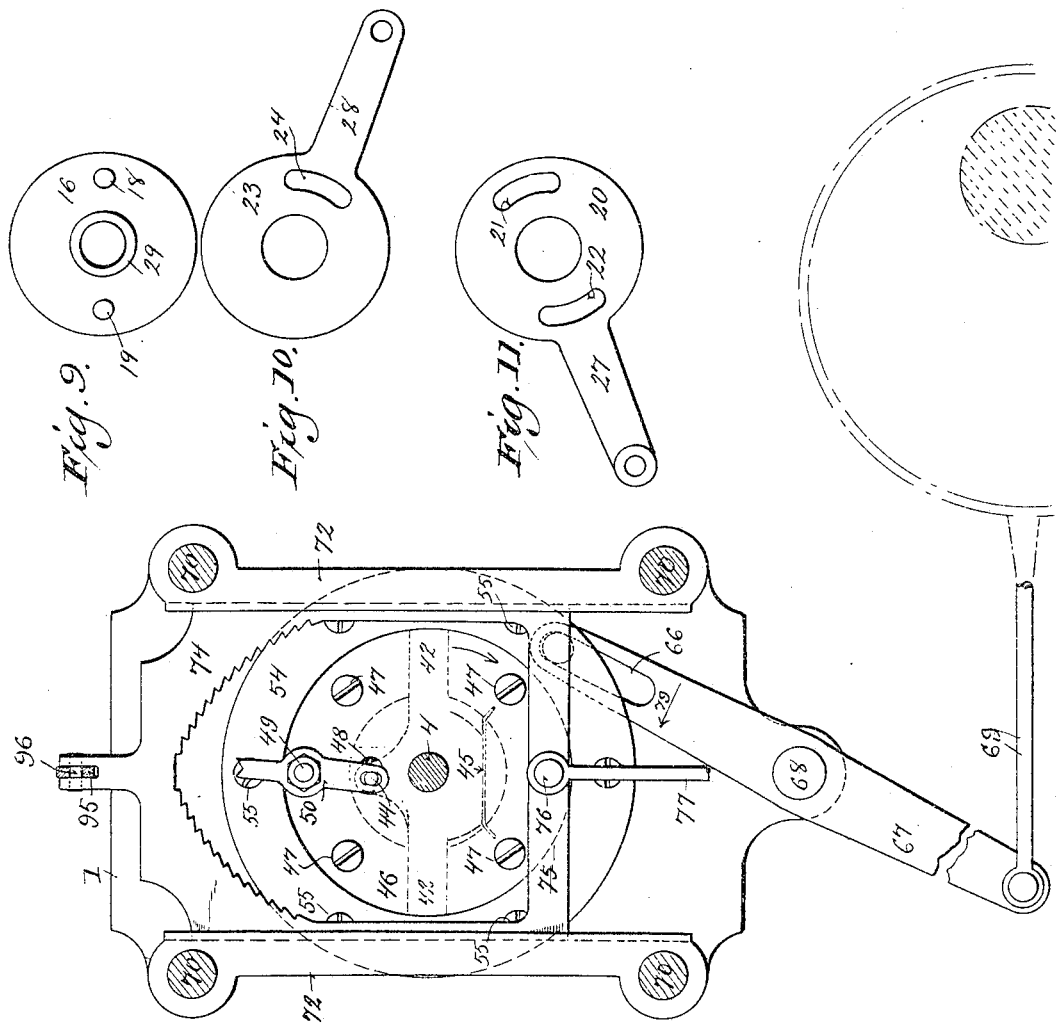

Movement is imparted to the wrist-plate 52 in the following manner, referring especially to Figs. 1 and 3: 65 is a headed pin projecting from the said wrist-plate, which passes through slot 66 in the upper end of lever 67, which is pivoted, as shown at 68, to a projecting portion of valve-casing 1. The other end of this lever in practice is connected by a link 69 to an eccentric driven by the engine, as indicated in dotted lines in Fig. 3. This communication permits a positive movement of wrist-plate with each quarter-revolution of the eccentric, sufficient, if uninterrupted, to fully open the valve.

Projecting from the valve-casing are four longitudinally-extending rods 70 70, which are connected at their outer ends by a spider 71. These rods adjacent to the wrist-plate are connected by guide-rails 72, having opposed inner vertical grooves for the reception of vertical outer tongues 73 on the sliding knock-off cam 74, whose side pieces are connected at their lower ends by a bridge-piece 75. To a lug 76 on said bridge-piece there is pivotally connected the upper end of a rod 77, extending to a dash-pot 78, this being for the purpose of maintaining the cam in its normal position to permit full opening of the valve until the operation of the governor interrupts. It being understood that when the valve is closed and the dash-pots 33 34 are holding it in that position the tappet-finger 50 will then always be in the vertical position shown in Fig. 3, and when the wrist-plate 52 is rocked in the direction of the arrow 79 in said figure then by reason of the engagement of the catch-plate arm 42 with one of the dogs 58 the valve is opened to admit steam to the engine and the tappet-finger is being moved away from its central position until its top notch engages the lower notch in the cam 74, which will reverse the catch-plate, withdrawing one end from the lately-engaged dog and projecting the other end into the path of the other dog, and the dash-pots 33 34 will at once again close the valve and bring the tappet-finger back to a vertical position, and should the cam-plate be pushed farther down toward the valve-stem 4 and the just-described operation be repeated the tapper-finger will strike the cam-plate at one of the intermediate notches thereof, and thus close the valve before the lever 67 has completed its movement.

The depression of the cam-plate just referred to is controlled by the action of the governor. In the illustration given the governor comprises a hollow spindle or sleeve 80, loosely surrounding the valve-stem 4 and having its bearing in the spider 71, the inner end of said sleeve terminating in a disk 81, rigid therewith. This disk is provided with two opposed radial slots 82 82 and has slotted ears 83 83, whose slots coincide with those in said disk.

84 84 designate the balls or weights of the governor, which are attached to bell-crank levers 85, pivoted at 86 to said ears 83, and the short arms of these levers 85 engage a grooved collar 87, loosely mounted on said sleeve 80, there being a spring 88 surrounding said sleeves between said collar and the disk 81. On the outer side of the collar 87 are two outwardly-projecting pins 89 89, which engage slots in a spanner forming the lower end of a lever 90, pivoted, as shown at 91, on a lug 92 on a cross-brace 93, extending between the upper pair of rods 70. Beyond this pivotal point 91 the lever 90 extends back over said cross-brace and is pivoted at 94 to a walking-beam 95, whose other end is pivoted, as shown at 96, to the knock-off cam 74, the said walking-beam 95 having an elongated slot 97, by means of which and a pin 98 it is fulcrumed to a bracket 99, projecting from said cross-brace 93. This governor is driven from the engine by belt 100 and pulley 101, which latter is fast on the sleeve 80. When the speed of the engine becomes excessive, the weights of the governor centrifugally throw out from the valve-stem and force the collar 87 inward against the force of the spring 88, permitting the dash-pot 78 to draw down the knock-off cam 74 by reason of this withdrawal of the collar 87, which enables the spanner end of the lever 90 to follow it.

By reason of the described mechanism applied to an ordinary reciprocating engine it is rendered possible to regulate the amount of steam admitted to the engine in proportion to the load and to automatically cut off the supply of steam at any intermediate part of the stroke and work on expansion in the same manner as in the well-known Corliss type, and thus greatly economize in the use of the steam.

Having thus described my invention, what I claim as new, and desire to secure by Letters Patent, is—

1. In a steam-engine, the combination with a valve-casing, valve-stem and rocking valve, means secured to said valve-stem for bringing said valve to the closing-point from either direction, a positively-actuated wrist-plate provided with oppositely-arranged dogs, a chambered disk or housing connected to said valve-stem, a reciprocating catch-plate in said disk or housing for engagement with either of said dogs, and a governor-controlled knock-off cam for releasing said catch-plate from such engagement.

2. In a steam-engine, the combination with a valve-casing, valve-stem, and rocking valve, independently-moving disks secured to one end of said valve-stem, and each having a valve-lever projecting therefrom, dash-pots and their rods connected to said valve-levers, a positively-actuated wrist-plate provided with oppositely-arranged dogs, a chambered disk or housing connected to said valve-stem, a reciprocating catch-plate in said disk or housing for engagement with either of said dogs, a tappet-finger pivoted to said disk or housing and connected to said catch-plate, a reciprocating knock-off cam in the path of said tappet-finger and a governor for controlling the reciprocation of said cam.

3. In a steam-engine, the combination with a valve-casing, valve-stem and rocking valve, means secured to said valve-stem for bringing said valve to its closing-point from either direction, a positively-actuated wrist-plate provided with oppositely-arranged dogs for opening the valve in either direction, and a governor-controlled mechanism for releasing said dogs at any point intermediate of the completion of movement of the wrist-plate in either direction.

4. In a steam-engine, the combination with a valve-casing, valve-stem, and rocking valve, means secured to said valve-stem for bringing said valve to its closing-point from either direction, a positively-actuated wrist-plate provided with oppositely-arranged dogs for opening the valve in either direction, a reciprocating knock-off cam for releasing said dogs, a revoluble spindle, a governor mounted thereon, a reciprocating collar loose on the governor-spindle and connected to the knock-off cam, and lever connections between the weights of the governor and said collar.

In testimony that I claim the foregoing I have hereunto set my hand, at Portage, in the county of Columbia and State of Wisconsin, in the presence of two witnesses.

JAMES H. CLARK.

Witnesses:
G. W. MORRISON,
W. S. STROUD.